(12) United States Patent
Jang et al.

(10) Patent No.: US 7,532,383 B2
(45) Date of Patent: May 12, 2009

(54) ELECTROCHROMIC DEVICE HAVING IMPROVED COLOR PROPERTIES

(75) Inventors: Jae Eun Jang, Seoul (KR); Jae Eun Jung, Seoul (KR); Seung Nam Cha, Seoul (KR); Chang Ho Noh, Suwon-si (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 11/923,098

(22) Filed: Oct. 24, 2007

(65) Prior Publication Data

US 2008/0278792 A1    Nov. 13, 2008

(30) Foreign Application Priority Data

May 9, 2007    (KR) .................... 10-2007-0044977

(51) Int. Cl.
*G02F 1/155*    (2006.01)
*G09G 3/19*    (2006.01)
*C09K 19/02*    (2006.01)

(52) U.S. Cl. .................... 359/266; 345/49; 349/182

(58) Field of Classification Search ......... 359/265–270, 359/272–275, 277, 245–247, 254; 345/49, 345/105; 349/182–186; 348/814; 250/70; 438/929

See application file for complete search history.

(56) References Cited

U.S. PATENT DOCUMENTS

| | | | | |
|---|---|---|---|---|
| 6,118,573 A | * | 9/2000 | Kubo et al. | 359/266 |
| 6,762,150 B2 | * | 7/2004 | Sawano | 503/201 |
| 2006/0204866 A1 | * | 9/2006 | Hirano et al. | 430/7 |
| 2007/0171148 A1 | * | 7/2007 | Cassidy | 345/49 |

FOREIGN PATENT DOCUMENTS

KR    2001001456 A  *  1/2001

\* cited by examiner

*Primary Examiner*—Scott J Sugarman
*Assistant Examiner*—DaWayne A Pinkney
(74) *Attorney, Agent, or Firm*—Cantor Colburn LLP

(57) ABSTRACT

An electrochromic device which includes a display electrode including a conductive layer disposed on a transparent substrate, a counter electrode disposed to face the display electrode, the counter electrode including a white reflective layer, an electrolyte interposed between the display electrode and the counter electrode, a first electrochromic material layer disposed on the display electrode and a second electrochromic material layer disposed on the counter electrode.

17 Claims, 11 Drawing Sheets

ELECTROCHROMIC DEVICE HAVING IMPROVED COLOR PROPERTIES

This application claims priority to Korean Patent Application No. 10-2007-0044977, filed on May 9, 2007, and all the benefits accruing therefrom under 35 U.S.C. §119, the contents of which in its entirety are herein incorporated by reference.

BACKGROUND OF THE INVENTION

1. Field of the Invention

The present invention relates to an electrochromic device, and more particularly, to an electrochromic device having improved color properties and method of manufacturing the same.

2. Description of the Related Art

In general, a reversible color change caused by an application of an electric field is referred to as "electrochromism," and a material having optical properties that are able to reversibly change colors in response to an electrochemical redox reaction is referred to as an "electrochromic material." That is, the electrochromic material is characterized in that the electrochromic material is in an uncolored state in an absence of an external electric field and the electrochromic material is then colored by an application of an external electrical field, or, conversely, the electrochromic material is in a colored state in the absence of an external electric field and then the color of the electrochromic material is made to disappear by the application of the electric field. Examples of such electrochromic materials include, but are not limited to, metal oxides, for example, tungsten oxide and molybdenum oxide, and organic compounds, for example, pyridine compounds, aminoquinone compounds and viologen.

An electrochromic device using such an electrochromic principle has superior reflectivity, outstanding flexibility and portability and is lightweight, and therefore such electrochromic devices are expected to be used in various flat panel displays. In particular, the electrochromic device may be applied to e-paper, which is under thorough study as an electronic medium that may replace paper, and thus is receiving increasing attention.

FIG. 1A is a schematic cross-sectional view illustrating a conventional electrochromic device of the prior art. The electrochromic device 1 includes an upper transparent electrode 10 coated with a transparent semiconductor material (e.g., tin oxide ("$TiO_2$")) and an electrochromic material 20, and a lower electrode 50 coated with a counter material 40 (e.g., antimony-doped tin oxide ("ATO")), for a more efficient electrochemical reaction, and with a reflective material 30 for reflecting light.

The electrochromic material 20 is in a transparent state in an absence of an electric field, and thus admits light therethrough, however while the electrochromic material 20 is oxidized or reduced by an application of an electric field, the electrochromic material 20 displays a predetermined color. That is, when no electric field is applied, the electrochromic material 20 is in a transparent state, and thus there is no wavelength of light that is absorbed by the electrochromic material 20. Accordingly, all wavelengths of incident light are allowed to pass through the upper transparent substrate 10 and are then reflected from the lower reflective layer 30, thus emitting light again to the upper surface of the device. Consequently, an observer positioned at a front of the display device may see a white color (FIG. 1B).

However, when an electric field is applied, the electrochromic material 20 of the electrochromic device 1 displays a predetermined color in response to the oxidation or reduction of electrons therein, and thereby all wavelengths of light, other than the predetermined color, are absorbed. As illustrated in FIG. 1C, only the predetermined color of the electrochromic material 20 is allowed to pass through the upper transparent substrate 10, and light having the other wavelengths is absorbed by the electrochromic material 20. Ultimately, because light of the predetermined color is exclusively emitted again to the upper surface through the lower reflective substrate, an observer may see such a predetermined color.

Further, the electrochromic device 1 may be formed into a color display device having red, green and blue elements as a single unit element, similar to general display devices. FIGS. 2A through 2F illustrate a color display principle of a conventional display device of the prior art using three color elements as a single unit element.

In order to display a white color in such a conventional electrochromic device, an electric field is eliminated from all of color display elements (FIG. 2A). As such, since the electrochromic materials of the color display elements are in a transparent state, white light is transmitted through all of the color display elements and is then reflected from the reflective substrate. Accordingly, an observer may see a white color.

In order to display a red color, an electric field is applied to a red display element but the electric field is not applied to the other color elements (i.e., green and blue). Thereby, red light is allowed to pass through the red display element and is then reflected, thus displaying a red color. Further, the other color elements display a white color, and consequently an observer recognizes a red color (FIG. 2B). Similarly, a green color or a blue color may be displayed by applying an electric field to the corresponding display element (FIG. 2C, 2D).

In particular, in a case of displaying a black color, an electric field is applied to all of the color display elements, such that respective display elements exhibit a red color, a green color and a blue color. At this time, because light is reflected in a smaller amount than in the case of displaying a white color, an observer recognizes a black color (FIG. 2E).

In this way, in the case where the electrochromic device displays a black color, the electrochromic device exhibits a phenomenon that is opposite to that of a typical light-emitting display device. That is, when all of the red, green and blue display elements are driven, to thereby emit light, the typical light-emitting display device displays a white color, however the conventional electrochromic device of the prior art displays a black color.

The electrochromic device accords to the principle in which light is emitted in a smaller amount than in the case of a white color, to thereby make an observer recognize a black color. In this case, however, since light is incident on the eyes of an observer in reality, a visibility thereof is inevitably decreased.

As illustrated in FIG. 2F, good visibility may be assured when light is not emitted through any portion of a surface area of the electrochromic device. However, in the case where the conventional electrochromic device displays a black color, it is difficult to realize a state in which light is not emitted through the surface area of the electrochromic device due to the structural properties thereof.

BRIEF SUMMARY OF THE INVENTION

Accordingly, the present invention has been made keeping in mind the above problems occurring in the related art, and an aspect of the present invention is to provide an electrochromic device, including a display electrode coated with a first electrochromic material layer and a counter electrode disposed to face the display electrode and coated with a white reflective layer, in which a second electrochromic material layer is additionally formed on the counter electrode, to thereby improve a visibility thereof.

Another aspect of the present invention is to provide an electrochromic device, which is capable of displaying various gray scale levels by additionally forming the second electrochromic material layer on the counter electrode, as mentioned above.

According to an exemplary embodiment of the present invention, in order to achieve the above aspects, the present invention provides an electrochromic device which may include a display electrode having a conductive layer disposed on a transparent substrate, a counter electrode disposed to face the display electrode, and the counter electrode having a white reflective layer, an electrolyte interposed between the display electrode and the counter electrode, a first electrochromic material layer disposed on the display electrode and a second electrochromic material layer disposed on the counter electrode.

According to another exemplary embodiment of the present invention, the present invention provides an electrochromic device which may have a separated structure, in which a transparent substrate having conductive layers disposed on opposing surfaces thereof is further provided between the first electrochromic material layer and the second electrochromic material layer of the above-mentioned electrochromic device, thereby driving the first electrochromic material layer and the second electrochromic material layer separately from each other.

An exemplary embodiment of the electrochromic device of the present invention may be a transmissive electrochromic device, in which the reflective layer is replaced with a transparent material.

In the exemplary embodiment of an electrochromic device according to the present invention, in which the second electrochromic material layer may be additionally formed on the counter electrode, a black electrochromic material may be used as the material for the second electrochromic material layer, thereby improving the visibility of the display device.

In the exemplary embodiment of an electrochromic device according to the present invention, various gray scale levels may be displayed depending on a color and a concentration of the black electrochromic material.

In the exemplary embodiment of an electrochromic device according to the present invention, cyan, magenta and yellow electrochromic materials may be distributed on the second electrochromic material layer respectively corresponding to the red, green and blue electrochromic materials of the first electrochromic material layer, thereby improving a color visibility of the display device.

BRIEF DESCRIPTION OF THE DRAWINGS

The above and other aspects, features and other advantages of the present invention will be more clearly understood from the following detailed description, taken in conjunction with the accompanying drawings, in which.

DETAILED DESCRIPTION OF THE INVENTION

Figure 1A:
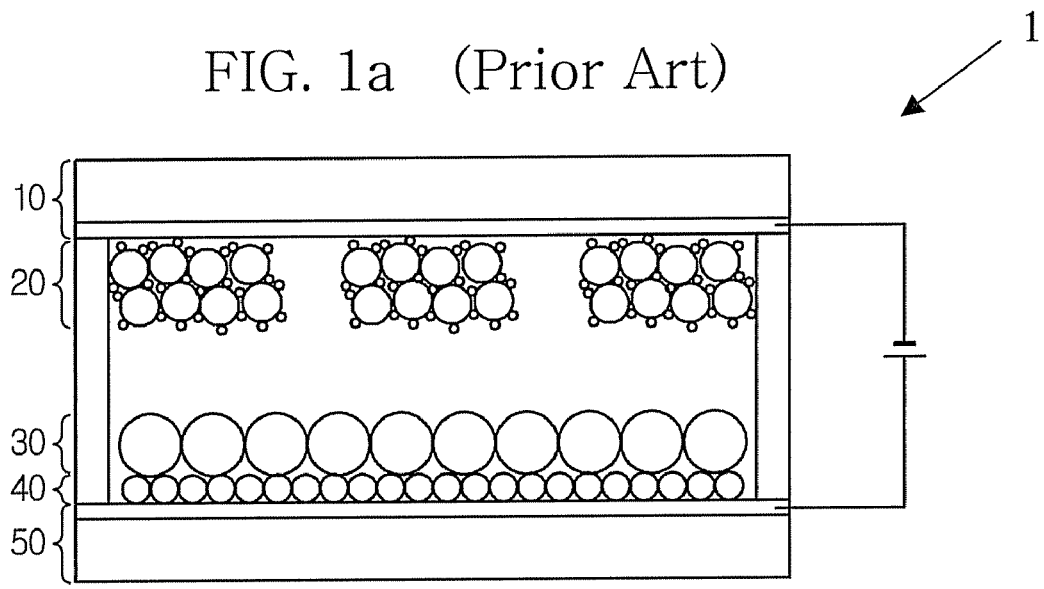
FIG. 1A is a schematic circuit diagram and cross-sectional view illustrating a conventional electrochromic device of the prior art.
Figure 1B:
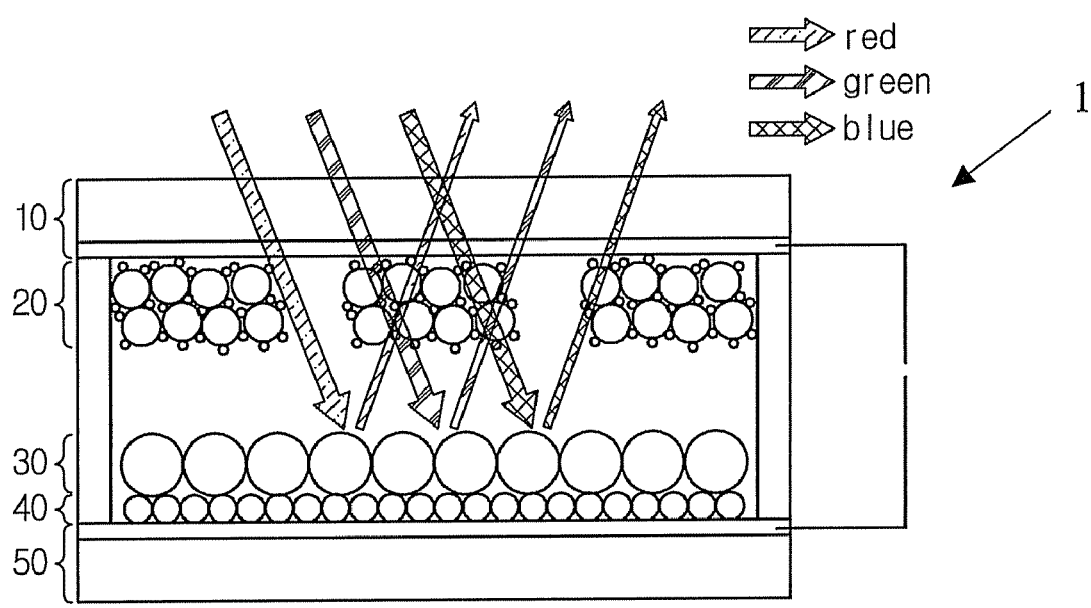
FIGS. 1B and 1C are schematic circuit diagrams and cross-sectional views illustrating a principle of displaying a white color and a predetermined color, respectively, in the conventional electrochromic device of the prior art as illustrated in FIG. 1A.
Figure 1C:
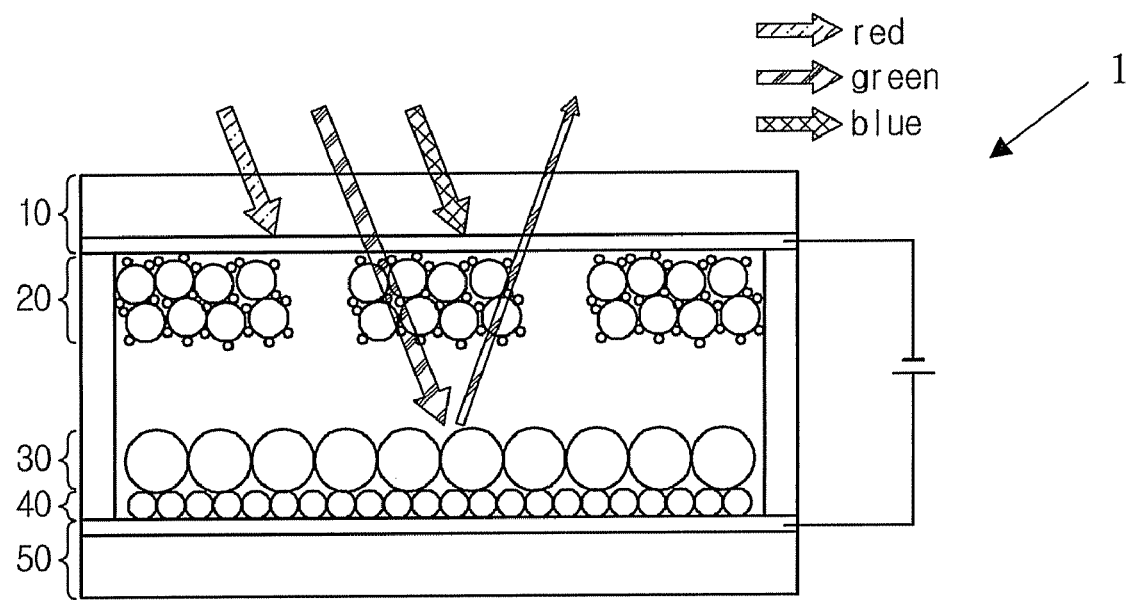
Figure 2A:
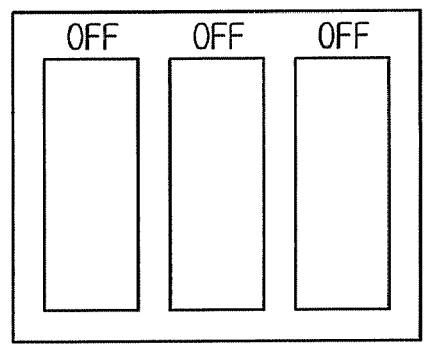
FIGS. 2A through 2F are schematic views illustrating a color display principle of the conventional electrochromic device of the prior art, using red, green and blue elements as a single unit element.
Figure 2B:
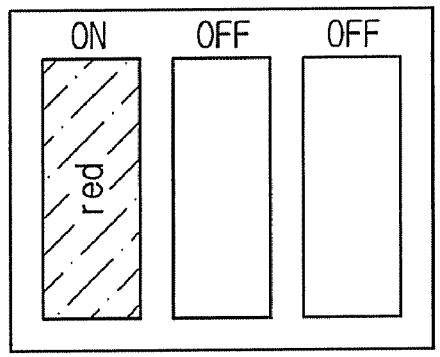
Figure 2C:
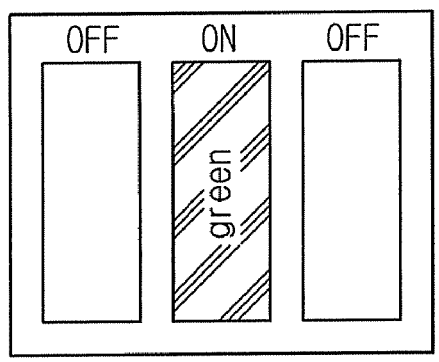
Figure 2D:
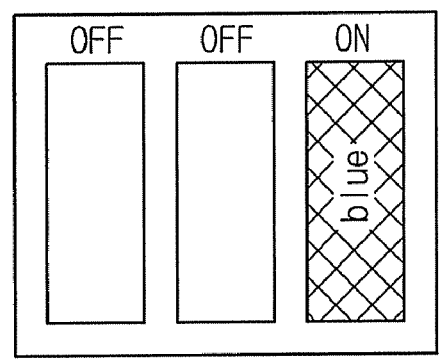
Figure 2E:
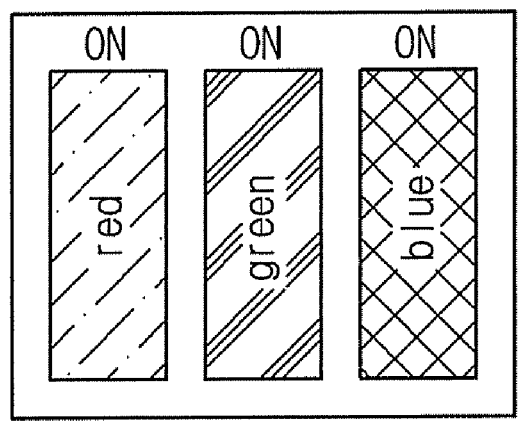
Figure 2F:
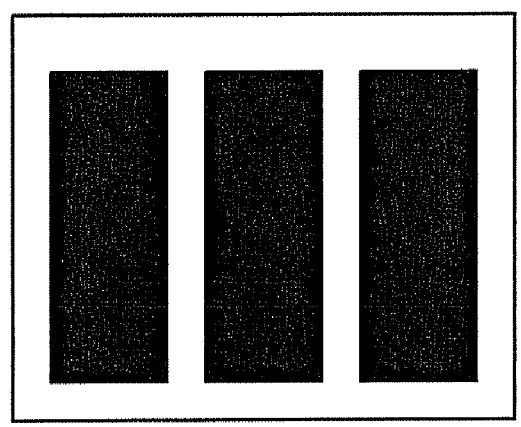

The invention now will be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the present invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another elements as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower", can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments of the present invention are described herein with reference to cross section illustrations that are schematic illustrations of idealized embodiments of the present invention. As such, variations from the shapes of the illustrations as a result, for example, of manufacturing techniques and/or tolerances, are to be expected. Thus, embodiments of the present invention should not be construed as limited to the particular shapes of regions illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present invention.

Hereinafter, a detailed description will be given of the present invention, with reference to the accompanying drawings.

Figure 3A:
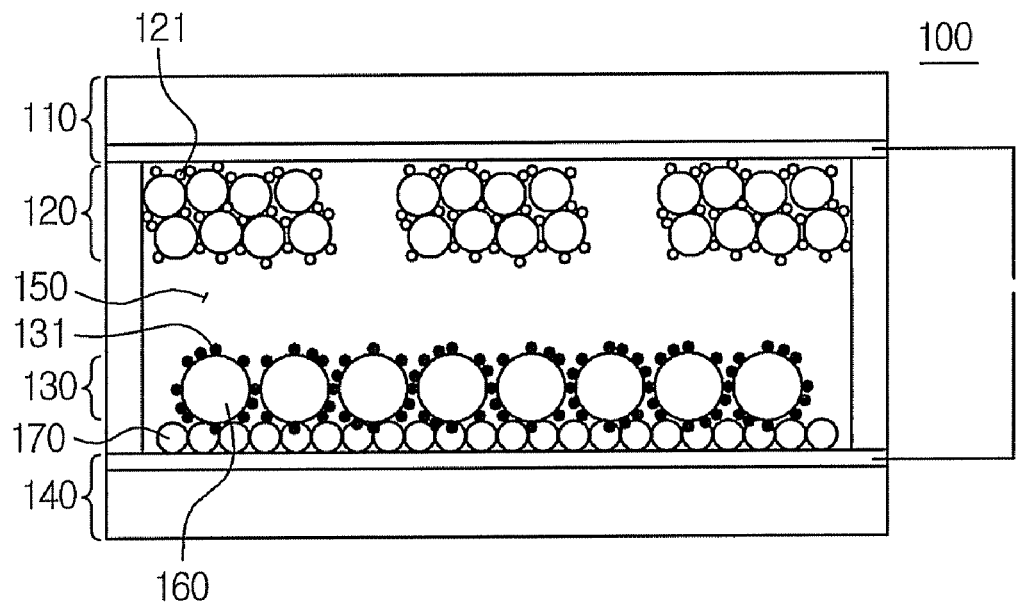
FIG. 3A is a schematic cross-sectional view illustrating a first exemplary embodiment of an electrochromic device according to the present invention.

FIG. 3A is a schematic circuit diagram and a cross-sectional view illustrating a first exemplary embodiment of an electrochromic device 100 according to the present invention. As illustrated in FIG. 3A, the electrochromic device 100 of the current exemplary embodiment includes a display electrode 110 including a conductive layer disposed on a transparent substrate, a counter electrode 140 disposed to face the display electrode 110 and including a white reflective layer 160, an electrolyte 150 interposed between the display electrode 110 and the counter electrode 140, a first electrochromic material layer 120 formed on the display electrode 110 and a second electrochromic material layer 130 formed on the counter electrode 140. In exemplary embodiments, the counter electrode 140 may include a conductive layer disposed thereon.

In exemplary embodiments, the first electrochromic material layer 120 may include a single electrochromic material displaying a predetermined color, or two or more electrochromic materials displaying colors different from each other.

In exemplary embodiments, the second electrochromic material layer 130 may include a single electrochromic material displaying a predetermined color, or two or more electrochromic materials displaying colors different from each other. As such, in exemplary embodiments, the single electrochromic material displaying a predetermined color may be a black electrochromic material. However, the present invention is not limited thereto.

In exemplary embodiments, when the first electrochromic material layer 120 is composed of red, green and blue electrochromic materials, then the second electrochromic material layer 130 may include cyan, magenta and yellow electrochromic materials respectively corresponding to the red, green and blue electrochromic materials of the first electrochromic material layer 120.

In exemplary embodiments, the single electrochromic material for exhibiting a black color may be selected from a group consisting of metal oxides, pyridine compounds, aminoquinone compounds and viologen, however the present invention is not limited thereto.

In exemplary embodiments, when two or more electrochromic materials are mixed so as to exhibit a black color, then the electrochromic material may include two or more materials selected from a group consisting of metal oxides, including tungsten oxide and molybdenum oxide, pyridine compounds, aminoquinone compounds and viologen.

In an exemplary embodiment, a counter material layer 170 (which provides electrons or holes) is disposed on the counter electrode 140 to efficiently realize an electrochemical reaction of the electrochromic materials.

In exemplary embodiments, the transparent substrate is a transparent inorganic substrate, for example, quartz or glass, or a transparent plastic substrate, for example, polyethylene terephthalate ("PET"), polyethylene naphthalate ("PEN"), polycarbonate, polystyrene, or polypropylene, however the present invention is not limited thereto.

In exemplary embodiments, a transparent conductive material may be used without limitation as a conductive material, and specific examples thereof include, but are not limited to, indium tin oxide ("ITO"), fluorine doped tin oxide ("FTO"), or conductive polymers, for example, polyphenylacetylene polymers and polythiophene.

In exemplary embodiments, any conventionally known material may be used without limitation as the electrolyte 150, and specific examples thereof include, but are not limited to, solvents in which lithium salts, potassium salts, or sodium salts are dissolved. However, the present invention is not limited thereto.

In exemplary embodiments, any conventionally known material may be used without limitation as the material for the white reflective layer, and specific examples thereof include, but are not limited to tin oxide ("$TiO_2$"), barium sulfate ("BaSO$_4$"), aluminum oxide ("Al$_2$O$_3$"), zinc oxide ("ZnO") and magnesium oxide ("MgO").

An operation of the first exemplary embodiment of an electrochromic device 100 according to the present invention will now be described in more detail.

Figure 3B:
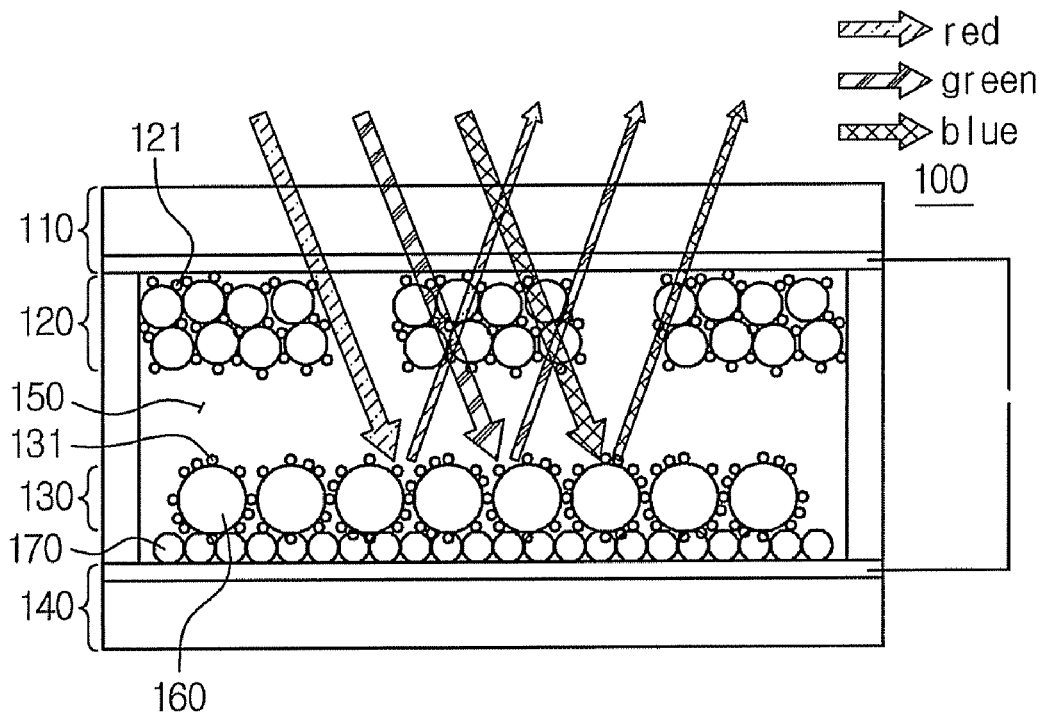
FIGS. 3B through 3D are schematic cross-sectional views illustrating a principle of displaying a white color, a predetermined color and a black color, respectively, in the first exemplary embodiment of an electrochromic device according to the present invention.
Figure 3C:
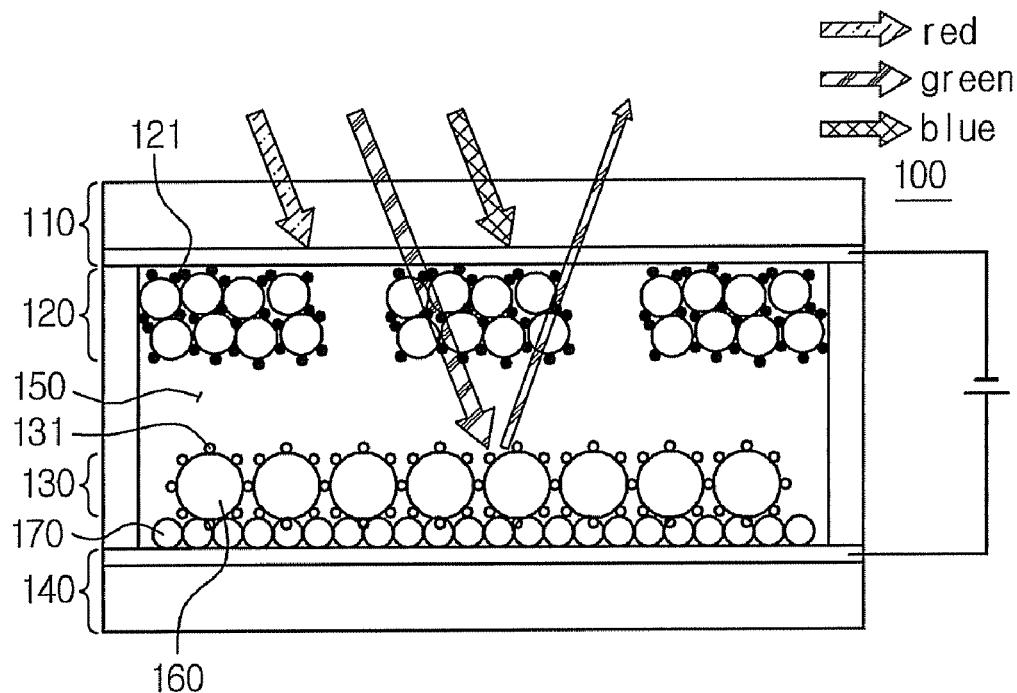
Figure 3D:
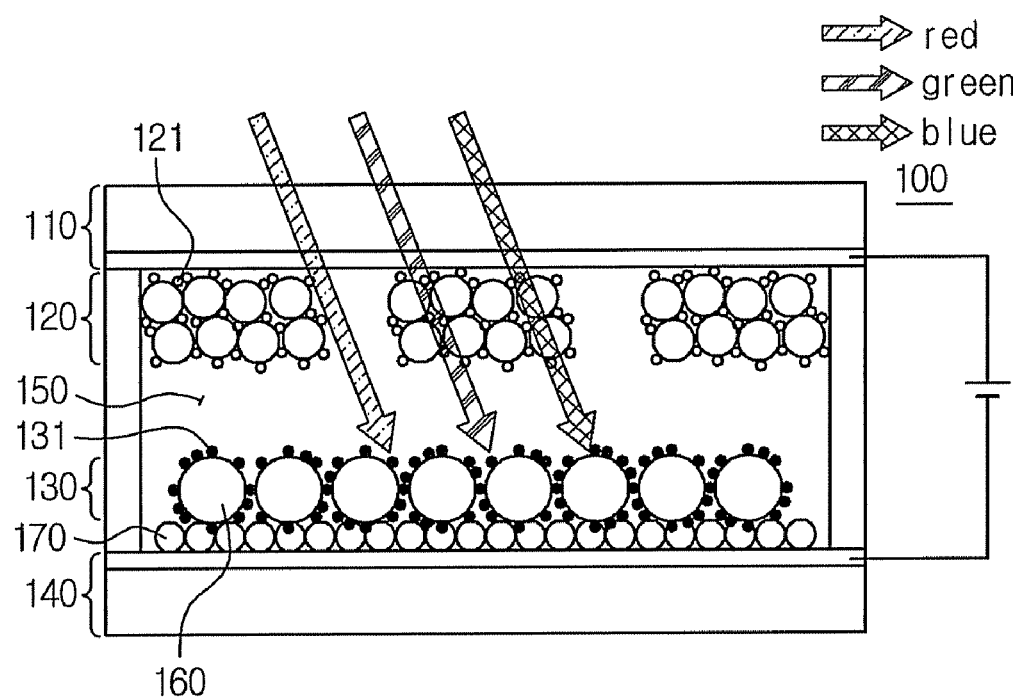

FIGS. 3B to 3D illustrate the principle of displaying a white color, a predetermined color and a black color, respectively, in the first exemplary embodiment of an electrochromic device 100 according to the present invention.

When no electric field is applied to the electrochromic device 100, both of the upper and lower electrochromic materials 120 and 130 of the electrochromic device 100 are in a transparent state, and thus incident white light is allowed to pass through the display electrode 110 and the white light is then reflected from the reflective layer 160 toward an external environment of the electrochromic device 100, thereby displaying a white color (FIG. 3B).

However, when an electric field is applied to the display electrode 110, the first electrochromic material layer 120 applied on the display electrode 110 is supplied with electrons or holes to thereby display a predetermined color (FIG. 3C). In an exemplary embodiment, when the first electrochromic material layer 120 is composed of a green electrochromic material, green light is transmitted through the display electrode 110 and the green light is then reflected from the reflective layer 160 toward the external environment of the electrochromic device 100, consequently a green color is displayed.

Conversely, in an alternative exemplary embodiment, when an electric field is applied to the counter electrode 140, the green electrochromic material 121 of the display electrode 110 is in a transparent state, and the black electrochromic material 131 of the counter electrode 140 is changed into a black color and thus absorbs all light passed through the display electrode 110, such that light is not emitted to any portion of the upper surface of the electrochromic device 100, thereby displaying a black color (FIG. 3D). Further, even though the electrochromic materials 120 and 130 of both electrodes are turned green and black, respectively, using a time gap or various other driving methods, light is not emitted to any portion of the upper surface of the device, thereby resulting in a black color.

Therefore, since a black color is displayed when no light is emitted, an observer may clearly recognize a black color as compared to when using the above-mentioned display device of the prior art in which all of the red, green and blue display elements are driven in order to display a black color.

In exemplary embodiments, the black electrochromic material 131 may consist of an electrochromic material itself displaying a black color or a mixture of two or more electrochromic materials displaying colors different from each other.

In addition, exemplary embodiments of the electrochromic device 100 according to the present invention are characterized in that various gray scale levels may be displayed.

In the conventional electrochromic device of the prior art, as illustrated in FIG. 1a, a magnitude of voltage that is applied or a time required to apply the voltage is adjusted to thereby control a transparency of the electrochromic material. That is, a gray scale level of a color may be controlled depending on an intensity of the color of the electrochromic material. In this case, in order to display various gray scale levels, the conventional electrochromic device is insufficient since a concentration of the electrochromic material should be appropriately changed in proportion to the magnitude of voltage that is applied or to the time required to apply the voltage.

Figure 4A:
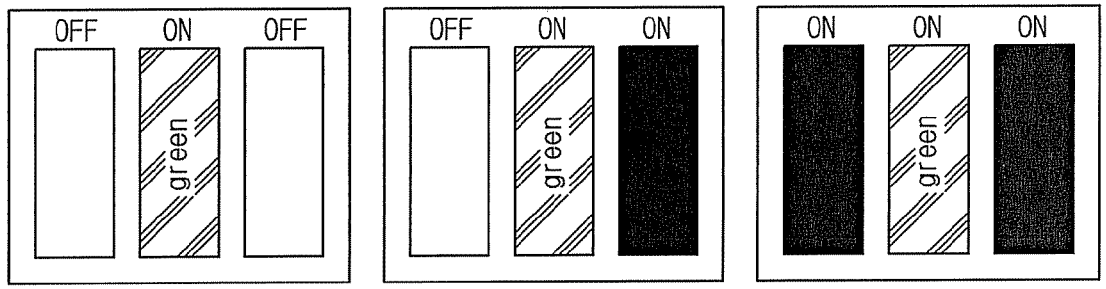
FIGS. 4A and 4B are schematic views illustrating a principle of displaying various gray scale levels in the first exemplary embodiment of an electrochromic device according to the present invention.
Figure 4B:
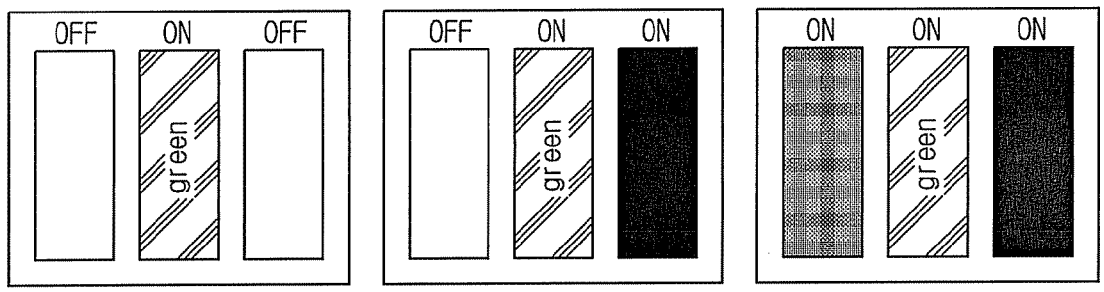

However, in the current invention, various gray scale levels may be easily displayed. That is, as illustrated in FIG. 4A, even though the electrochromic materials have only two properties, e.g., transparency and color, three gray scale levels may be displayed. As illustrated in FIG. 4B, in exemplary embodiments, the black electrochromic material of the counter electrode may be advantageously represented into various gray scale levels by appropriately adjusting a magnitude of the applied voltage or a time required to apply the voltage.

Figure 5:
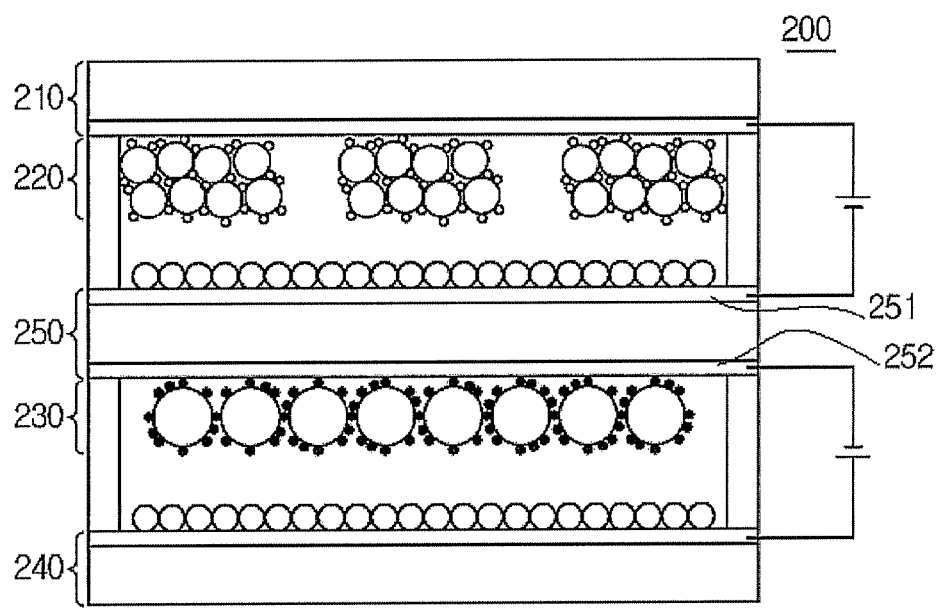
FIG. 5 is a schematic cross-sectional view illustrating a second exemplary embodiment of a separated electrochromic device according to the present invention.

FIG. 5 is a schematic cross-sectional view illustrating a second exemplary embodiment of an electrochromic device 200 according to the present invention.

As illustrated in FIG. 5, the exemplary embodiment of the electrochromic device 200 according to the present invention is characterized in that a first electrochromic material layer 220 is separated from a second electrochromic material layer 230.

With reference to FIG. 5, the electrochromic device 200 of the present invention further includes a transparent substrate 250, including conductive layers 251, 252 disposed on opposing surfaces thereof, disposed between a display electrode 210 and a counter electrode 240. In this case, since the first electrochromic material layer 220, which displays a predetermined color, and the second electrochromic material layer 230, which displays a black color, may each be independently driven by an electric field, the electrochromic device may have a degree of freedom much higher than the exemplary embodiment of an electrochromic device of FIG. 3a.

In an exemplary embodiment, when an electric field is applied to the first electrochromic material layer 220 to thereby display a predetermined color, a magnitude of the voltage applied to the lower black electrochromic material layer 230 or a time required for such an application is adjusted to thereby control a concentration of the black electrochromic material, thereby changing a reflectivity of the reflective layer and resulting in various gray scale levels.

Figure 6A:
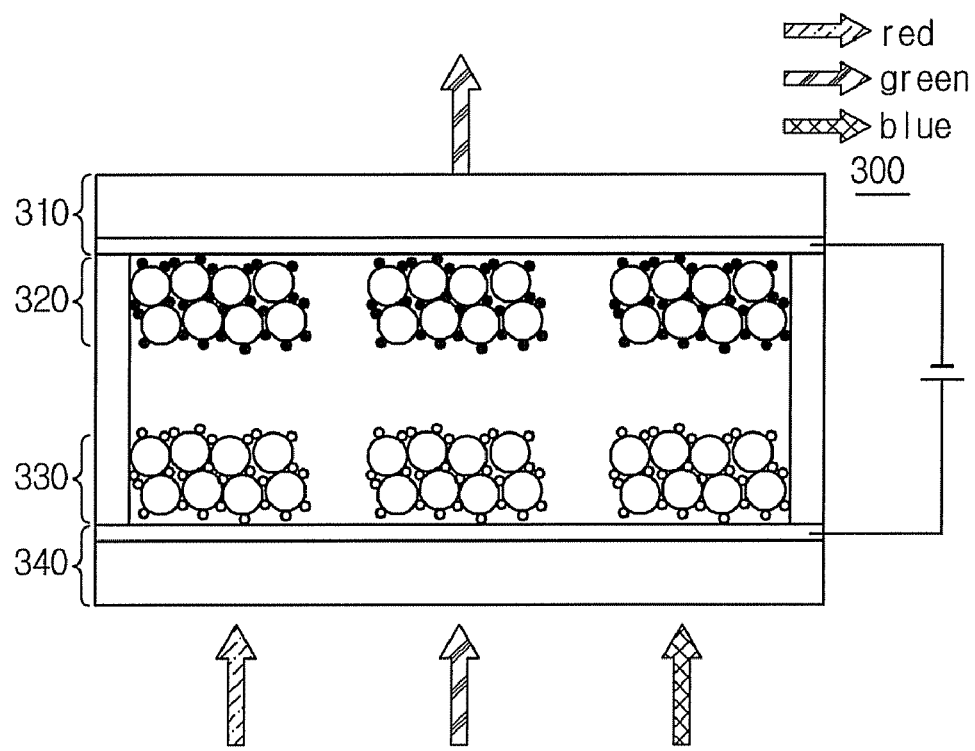
FIGS. 6A and 6B are schematic cross-sectional views illustrating a color display principle of a third exemplary embodiment of a transmissive electrochromic device according to the present invention.
Figure 6B:
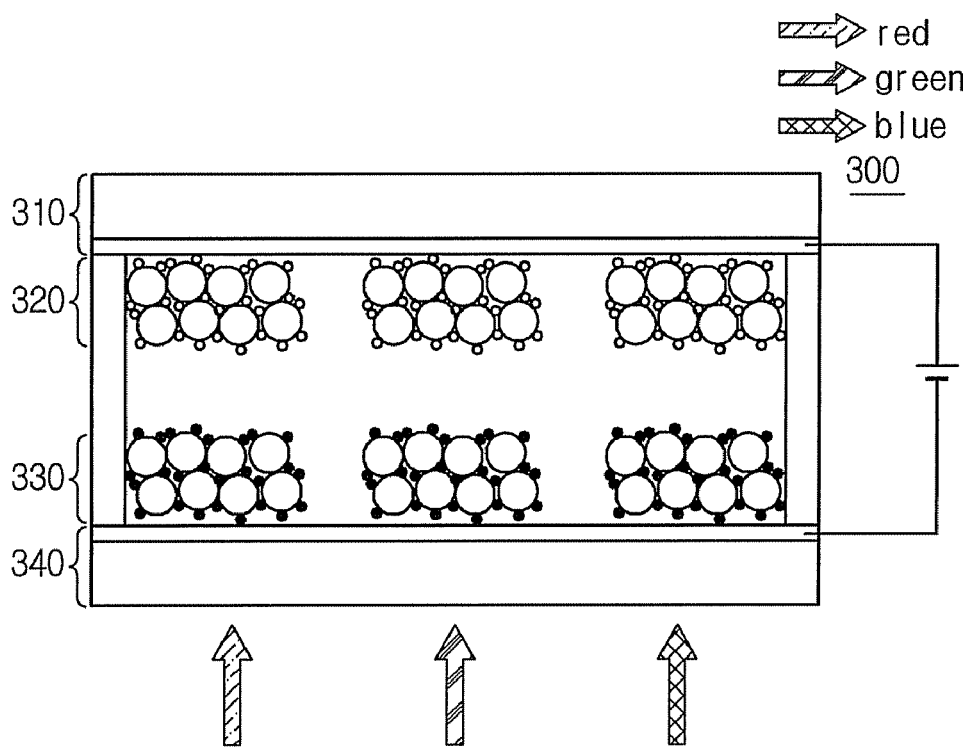

According to a third exemplary embodiment of the present invention, an electrochromic device 300 is a transmissive electrochromic device formed without a reflective layer, as illustrated in FIGS. 6A and 6B.

As illustrated in FIGS. 6A and 6B, the exemplary embodiment of an electrochromic device 300 according to the present invention includes a display electrode 310, a first electrochromic material layer 320, a second electrochromic material layer 330 and a counter electrode 340. The first electrochromic material layer 320, which displays a predetermined color, is formed on the display electrode 310, and the second electrochromic material layer 330, which displays a black color, is formed on the transparent counter electrode 340. In exemplary embodiments, the electrochromic device 300 may be used as a display by controlling the color of the electrochromic material layer 320, 330 and an amount of light when white light is incident on the counter electrode 340. FIG. 6A is a cross-sectional schematic view illustrating when a predetermined color is displayed, and FIG. 6B is a cross-sectional schematic view illustrating when a black color is displayed.

In exemplary embodiments, when the electrochromic material layer is formed by supporting the electrochromic materials on a nanostructure, the electrochromic material may be applied on a larger surface area, and thus the concentration thereof is increased in order to facilitate a control of light so as to aid a driving of the device. In exemplary embodiments, various semiconductor-based nanostructures may be used as the nanostructure, and examples thereof include, but are not limited to, TiO$_2$, ZnO$_2$ and copper oxide ("CuO").

In exemplary embodiments, the transmissive electrochromic device 300 may be structured such that the two electrochromic material layers 220 and 230 are separated from each other, as illustrated in FIG. 5.

Figure 7A:
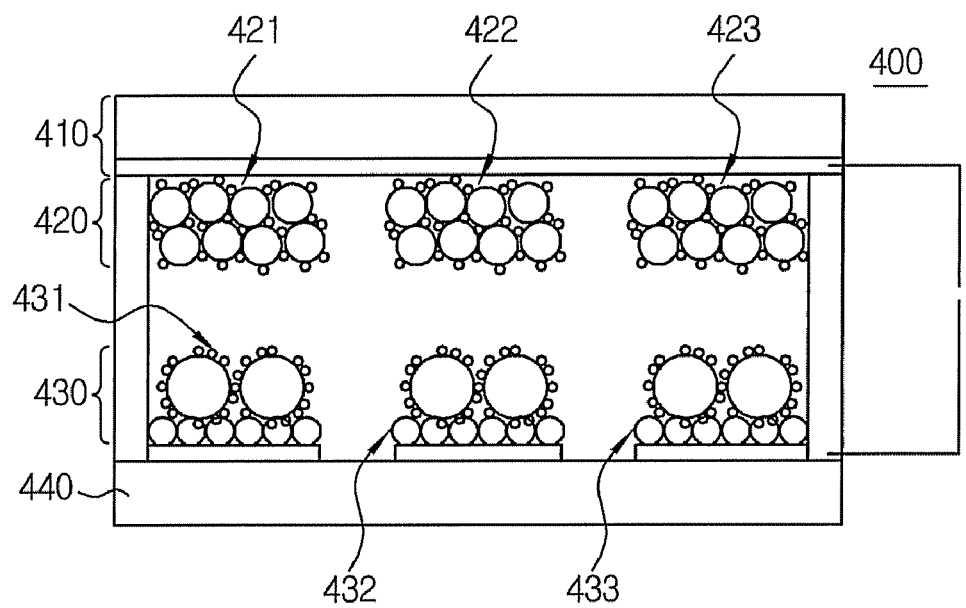
FIGS. 7A and 7B are schematic cross-sectional views illustrating a fourth exemplary embodiment of an electrochromic device according to the present invention, in which red, green and blue electrochromic materials are applied on a display electrode, and cyan, magenta and yellow electrochromic materials are applied on a counter electrode.
Figure 7B:
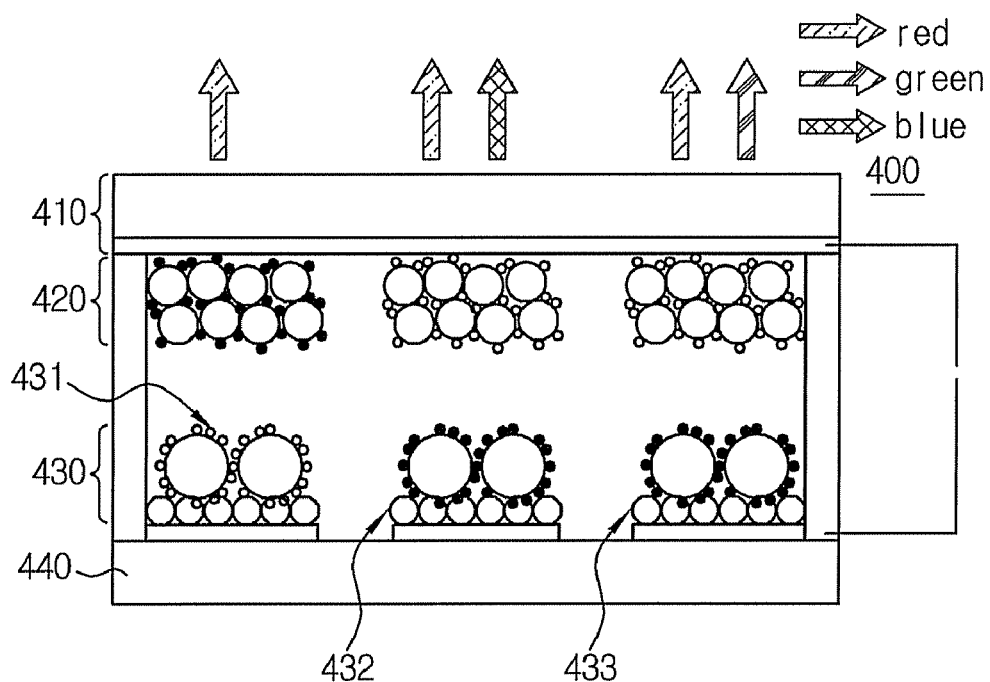

FIGS. 7A and 7B illustrate a fourth exemplary embodiment of an electrochromic device 400 according to the present invention.

FIG. 7A illustrates the fourth exemplary embodiment of an electrochromic device 400 according to the present invention, in which red, green and blue electrochromic materials are applied on a first electrochromic layer, and cyan, magenta and yellow electrochromic materials, respectively corresponding to the red, green and blue electrochromic materials, are applied on a second electrochromic layer.

As illustrated in FIG. 7A, the first electrochromic material layer 420 of a display electrode 410 is coated with a red electrochromic material 421, a green electrochromic material 422 and a blue electrochromic material 423, and the second electrochromic material layer 430 of a counter electrode 440 is coated with a cyan electrochromic material 431, a magenta electrochromic material 432 and a yellow electrochromic material 433, respectively corresponding to the red electrochromic material, the green electrochromic material and the blue electrochromic material of the first electrochromic material layer 420.

In exemplary embodiments, when an electric field is not applied to the electrochromic device 400, all of the red, green and blue electrochromic materials and the cyan, magenta and yellow electrochromic materials are in a transparent state, and thus incident white light is reflected from a reflective layer 450, thereby displaying a white color.

Figure 8A:
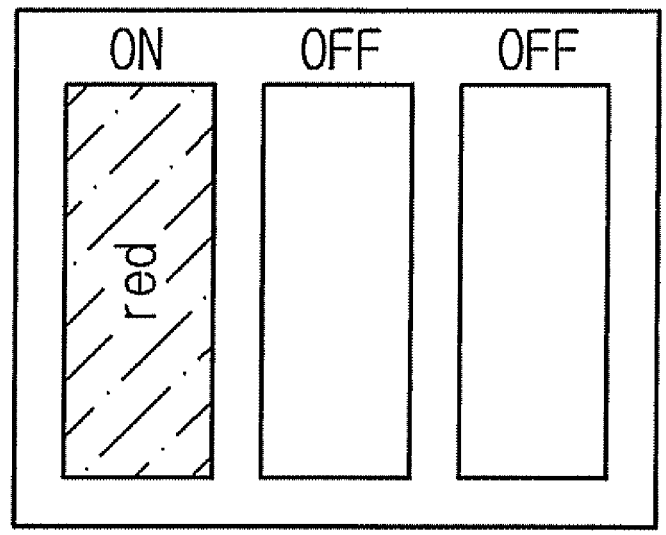
FIG. 8A is a schematic view illustrating a conventional color display principle of the prior art.
Figure 8B:
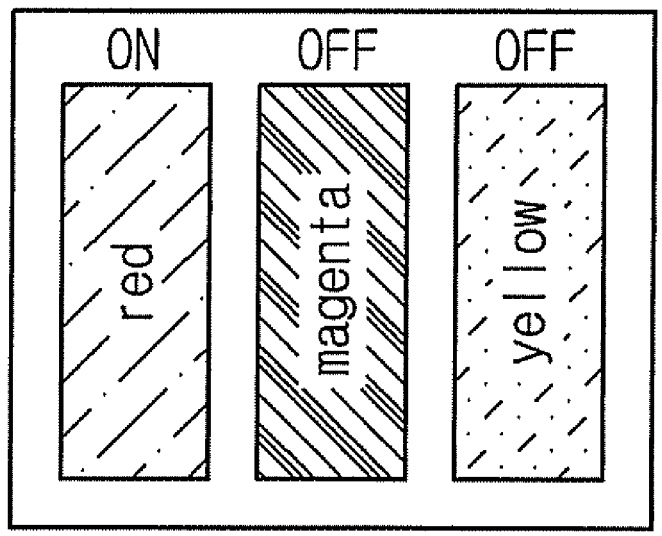
FIG. 8B is a schematic view illustrating a principle of improving a color visibility in the fourth exemplary embodiment of an electrochromic device according to the present invention.

As such, in order to display a red color, as shown in FIG. 7B, an appropriate electric field is applied to the red electrochromic material of the red display element 421 to thereby display a red color. Further, the green display element 422 functions to display a magenta color applied on the counter electrode and the blue display element 433 functions to display a yellow color. Thereby, as illustrated in FIGS. 8A and 8B, the red color formed by an exemplary embodiment of the electrochromic device of the present invention (FIG. 8B) may be significantly more visible than the red color formed by the conventional electrochromic device of the prior art (FIG. 8A).

Figure 9:
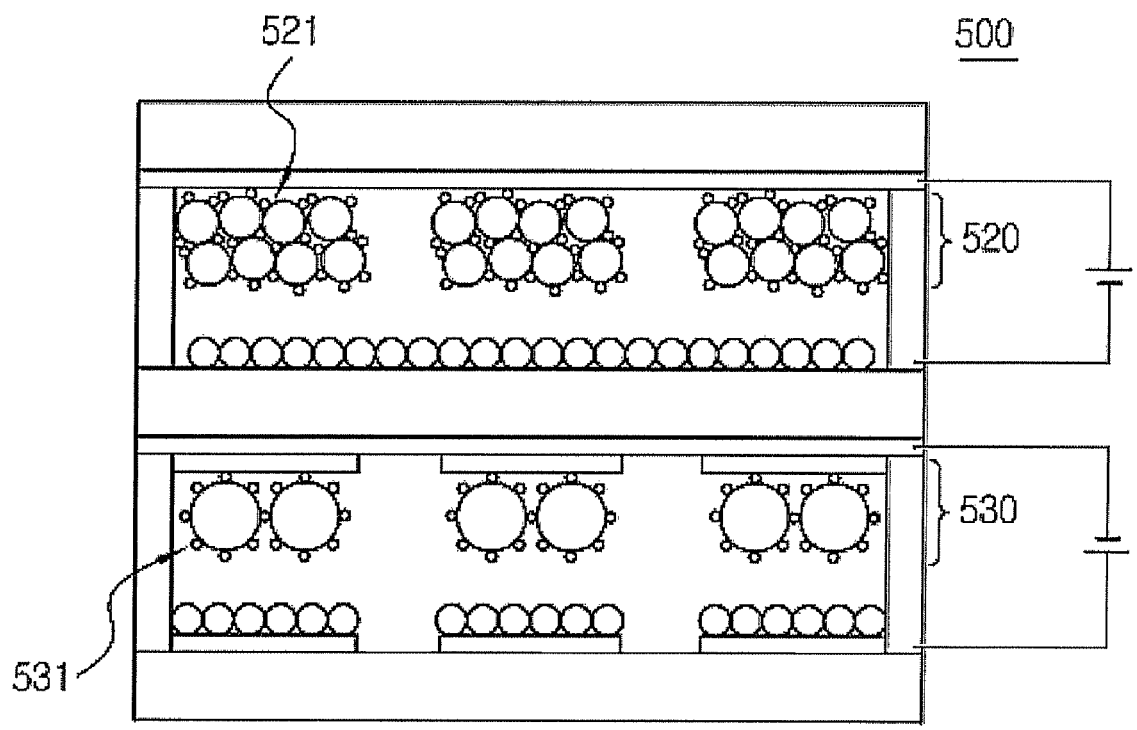
FIG. 9 is a schematic cross-sectional view illustrating a fifth exemplary embodiment of a separated electrochromic device according to the present invention, which is formed in a manner such that a structure of the electrochromic device of FIG. 7A is separated.

FIG. 9 illustrates a fifth exemplary embodiment of an electrochromic device 500 according to the present invention.

As illustrated in FIG. 9, the electrochromic device 500 is structured in a manner such that the first electrochromic material layer 520 and the second electrochromic material layer 530 are separated from each other, unlike the exemplary embodiment of an electrochromic device 400 of FIG. 7A. In the current exemplary embodiment of the electrochromic device 500 having such a separated structure, the electrochromic material layers 520 and 530 may be separately driven, and thus may have a much greater degree of freedom and may be capable of using more various driving methods in order to display predetermined colors.

In an exemplary embodiment, in the case where the electrochromic materials of a first electrochromic material layer 520 and a second electrochromic material layer 530 display predetermined colors, a black color, which is able to absorb all light, may be realized, unlike the exemplary embodiment of FIG. 7. This is because a red color is allowed to pass through the red display material 521 of the first electrochromic material layer 520 but is absorbed by the cyan display material 531 of the second electrochromic material layer 530, and thus no light is reflected and emitted to an external environment of the electrochromic device 500.

In exemplary embodiments, the structure of FIG. 9 may be used in a mode of the above-mentioned transmissive electrochromic device when the lower reflective layer is replaced with a transparent material.

In exemplary embodiments, the electrochromic device of the present invention may be widely used in various flat panel display devices, and, in particular, the electrochromic device is expected to be applied to flexible display devices or e-paper.

As described hereinbefore, the present invention provides an electrochromic device having improved color properties. In the electrochromic device of the present invention, an additional electrochromic material layer is formed on a counter electrode, to thereby effectively improve a visibility of the display device. In particular, a black electrochromic material is used as the additional electrochromic material of the counter electrode to thereby enable a display of various gray scale levels.

In further exemplary embodiments, cyan, magenta and yellow electrochromic materials are disposed on the second electrochromic material layer to correspond to red, green and blue electrochromic materials of the first electrochromic material layer, to thereby improve a color visibility of the display device.

Although some embodiments of the present invention have been disclosed for illustrative purposes, those of ordinary skill in the art will appreciate that various modifications, additions and substitutions are possible, without departing from the scope and spirit of the invention as disclosed in the accompanying claims.

What is claimed is:

1. An electrochromic device comprising:
a display electrode including a conductive layer disposed on a transparent substrate;
a counter electrode disposed to face the display electrode, the counter electrode including a white reflective layer;
an electrolyte interposed between the display electrode and the counter electrode;
a first electrochromic material layer disposed on the display electrode; and
a second electrochromic material layer disposed on the counter electrode.

2. The electrochromic device as set forth in claim 1, wherein the second electrochromic material layer comprises a black electrochromic material.

3. The electrochromic device as set forth in claim 2, wherein the black electrochromic material comprises a single electrochromic material or a mixture of two or more electrochromic materials displaying colors different from each other.

4. The electrochromic device as set forth in claim 3, wherein the single electrochromic material for displaying a black color is selected from a group consisting of metal oxide, a pyridine compound, an aminoquinone compound and viologen.

5. The electrochromic device as set forth in claim 3, wherein the two or more electrochromic materials for displaying a black color comprises a mixture of two or more materials selected from a group consisting of metal oxide, including tungsten oxide and molybdenum oxide, a pyridine compound, an aminoquinone compound and viologen.

6. The electrochromic device as set forth in claim 1, wherein the first electrochromic material layer comprises a red electrochromic material, a green electrochromic material and a blue electrochromic material.

7. The electrochromic device as set forth in claim 6, wherein the second electrochromic material layer comprises a cyan electrochromic material, a magenta electrochromic material and a yellow electrochromic material respectively corresponding to the red electrochromic material, the green electrochromic material and the blue electrochromic material of the first electrochromic material layer.

8. The electrochromic device as set forth in claim 2, wherein the second electrochromic material layer has a concentration which varies depending on a magnitude of voltage which is applied and a time required to apply the voltage.

9. The electrochromic device as set forth in claim 7, wherein the second electrochromic material layer has a concentration which varies depending on a magnitude of voltage which is applied and a time required to apply the voltage.

10. The electrochromic device as set forth in claim 1, further comprising a transparent substrate including conductive layers on opposing surfaces thereof, the transparent substrate disposed between the first electrochromic material layer and the second electrochromic material layer.

11. The electrochromic device as set forth in claim 10, wherein the first electrochromic material layer and the second electrochromic material layer are driven separately from each other.

12. The electrochromic device as set forth in claim 1, wherein the counter electrode comprises a transparent material, without the white reflective layer.

13. The electrochromic device as set forth in claim 10, wherein the counter electrode comprises a transparent material, without the white reflective layer.

14. The electrochromic device as set forth in claim 12, wherein the electrochromic material layer is disposed by supporting the electrochromic materials on a nanostructure.

15. The electrochromic device as set forth in claim 1, further comprising a counter material layer disposed on the counter electrode.

16. The electrochromic device as set forth in claim 10, further comprising a counter material layer disposed on the counter electrode.

17. The electrochromic device as set forth in claim 12, further comprising a counter material layer disposed on the counter electrode.

* * * * *